United States Patent
Suciu et al.

(10) Patent No.: US 7,607,286 B2
(45) Date of Patent: Oct. 27, 2009

(54) REGENERATIVE TURBINE BLADE AND VANE COOLING FOR A TIP TURBINE ENGINE

(75) Inventors: Gabriel L. Suciu, Glastonbury, CT (US); James W. Norris, Lebanon, CT (US); Craig A. Nordeen, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 113 days.

(21) Appl. No.: 11/719,956

(22) PCT Filed: Dec. 1, 2004

(86) PCT No.: PCT/US2004/040096

§ 371 (c)(1),
(2), (4) Date: May 23, 2007

(87) PCT Pub. No.: WO2006/059990

PCT Pub. Date: Jun. 8, 2006

(65) Prior Publication Data

US 2007/0295011 A1    Dec. 27, 2007

(51) Int. Cl.
*F02K 3/02* (2006.01)
(52) U.S. Cl. .................. 60/226.1; 60/262; 60/39.43; 415/115
(58) Field of Classification Search .......... 60/226.1, 60/39.162, 268, 805, 39.19, 39.95, 39.43, 60/39.34, 224, 225, 262, 263; 415/115, 116; 416/219 R, 232
See application file for complete search history.

(56) References Cited

U.S. PATENT DOCUMENTS

| | | | |
|---|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |

(Continued)

FOREIGN PATENT DOCUMENTS

DE    767704    5/1953

(Continued)

*Primary Examiner*—Michael Cuff
*Assistant Examiner*—Phutthiwat Wongwian
(74) *Attorney, Agent, or Firm*—Carlson, Gaskey & Olds PC

(57) ABSTRACT

A fan-turbine rotor assembly (24) includes a multitude of turbine blades (34) which each define a turbine blade passage which bleed air from a diffuser section (74) to provide for regenerative cooling. Regenerative cooling airflow is communicated from the radial core airflow passage (80) through the diffuser passages (144), through diffuser aspiration passages (146A, 146B) and into the turbine blade passages (150*a*). The regenerative cooling airflow exits from the turbine blade passage (150*a*) and transfers received thermal energy into an annular combustor (30). The received thermal energy is recovered at the highest temperature in the cycle.

4 Claims, 20 Drawing Sheets

U.S. PATENT DOCUMENTS

| | | |
|---|---|---|
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Liston et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1* | 10/2003 | Paul .................. 60/262 |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| DE | 765809 | 11/1954 |
| DE | 1301634 | 8/1969 |
| DE | 2361310 | 6/1975 |
| DE | 3333437 | 4/1985 |
| EP | 0661413 | 7/1995 |
| FR | 1033849 | 7/1953 |
| FR | 2566835 | 1/1986 |
| GB | 766728 | 1/1957 |
| GB | 958842 | 5/1964 |
| GB | 1046272 | 10/1966 |
| GB | 1287223 | 8/1972 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006059990 | 6/2006 |
| WO | WO 2006059980 | 6/2006 |
| WO | WO 2006059996 | 6/2006 |
| WO | WO 2006060001 | 6/2006 |
| WO | WO 2006060003 | 6/2006 |
| WO | WO 2006060005 | 6/2006 |
| WO | WO 2006060009 | 6/2006 |
| WO | WO 2006060012 | 6/2006 |
| WO | WO 2006059997 | 11/2006 |

* cited by examiner

US 7,607,286 B2

REGENERATIVE TURBINE BLADE AND VANE COOLING FOR A TIP TURBINE ENGINE

This invention was made with government support under Contract No.: F33657-03-C-2044. The government therefore has certain rights in this invention.

BACKGROUND OF THE INVENTION

The present invention relates to a gas turbine engine, and more particularly to airflow within a tip turbine engine to cool various sections thereof.

An aircraft gas turbine engine of the conventional turbofan type generally includes a forward bypass fan a compressor, a combustor, and an aft turbine all located along a common longitudinal axis. A compressor and a turbine of the engine are interconnected by a shaft. The compressor is rotatably driven to compress air entering the combustor to a relatively high pressure. This pressurized air is then mixed with fuel in a combustor and ignited to form a high energy gas stream. The gas stream flows axially aft to rotatably drive the turbine which rotatably drives the compressor through the shaft. The gas stream is also responsible for rotating the bypass fan. In some instances, there are multiple shafts or spools. In such instances, there is a separate turbine connected to a separate corresponding compressor through each shaft. In most instances, the lowest pressure turbine will drive the bypass fan.

Although highly efficient, conventional turbofan engines operate in an axial flow relationship. The axial flow relationship results in a relatively complicated elongated engine structure of considerable longitudinal length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor and ignited to form a high energy gas stream which drives the turbine integrated onto the tips of the hollow bypass fan blades for rotation therewith as generally disclosed in U.S. Patent Application Publication Nos.: 20030192303; 20030192304; and 20040025490.

The tip turbine engine provides a thrust to weight ratio equivalent to conventional turbofan engines of the same class within a package of significantly shorter length.

The tip turbine engine utilizes a fan-turbine rotor assembly which integrates a turbine onto the outer periphery of the bypass fan. Integrating the turbine onto the tips of the hollow bypass fan blades provides an engine design challenge.

Conventional turbines operate in a high temperature environment and typically receive cooling airflow from cooler sections of the engine. Once the cooling airflow is communicated to the turbine to receive thermal energy therefrom, the elevated temperature cooling airflow is dumped overboard. This may be somewhat inefficient from a thermal standpoint which may reduce the engine operating efficiency. Tip turbine engines provide novel opportunities for cooling flow redirection.

Accordingly, it is desirable to provide a turbine for a fan-turbine rotor assembly of a tip turbine engine which provides regenerative cooling airflow while minimizing effects on engine operating efficiency.

SUMMARY OF THE INVENTION

The fan-turbine rotor assembly according to the present invention includes a multitude of the hollow fan blades. Each fan blade includes an inducer section, a hollow fan blade section and a diffuser section. The diffuser sections form a diffuser surface about the outer periphery of the fan blade sections to provide structural support to the outer tips of the fan blade sections and to turn and diffuse the airflow from the radial core airflow passage toward an axial airflow direction. The turbine is mounted to the diffuser surface as one or more turbine ring rotors which include a multitude of turbine blade clusters.

The diffuser includes a multitude of diffuser passages which turn and diffuse the airflow from a radial core airflow passage toward an axial airflow direction. A multitude of diffuser aspiration passages are in communication with the diffuser passages and through the diffuser surface. Diffuser aspiration passages communicate with the diffuser passages at a location which reduces separation of the airflow as the airflow is turned from the radial core airflow passage toward an axial airflow direction through airflow aspiration at the potentially turbulent locations.

Each of the multitude of turbine blades defines a turbine blade passage. The turbine blade passages bleed air from the diffuser to provide for regenerative cooling. Regenerative cooling airflow is communicated from the radial core airflow passage through the diffuser passages, through the diffuser aspiration passages and into the turbine blade passages. The regenerative cooling airflow receives thermal energy from the turbine blades and increases the centrifugal compression within the turbine while transferring the increased temperature cooling airflow into the annular combustor to increase the efficiency thereof through regeneration.

The received thermal energy is recovered at the highest temperature in the cycle. The engine is thereby benefited twice. Once by the cooling that allows elevated temperatures on the turbine blades and a second time by the regeneration of the thermal energy which would otherwise be lost downstream as per conventional application.

The present invention therefore provides a turbine for a fan-turbine rotor assembly of a tip turbine engine which provides regenerative cooling airflow while minimizing the effect on engine operating efficiency.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
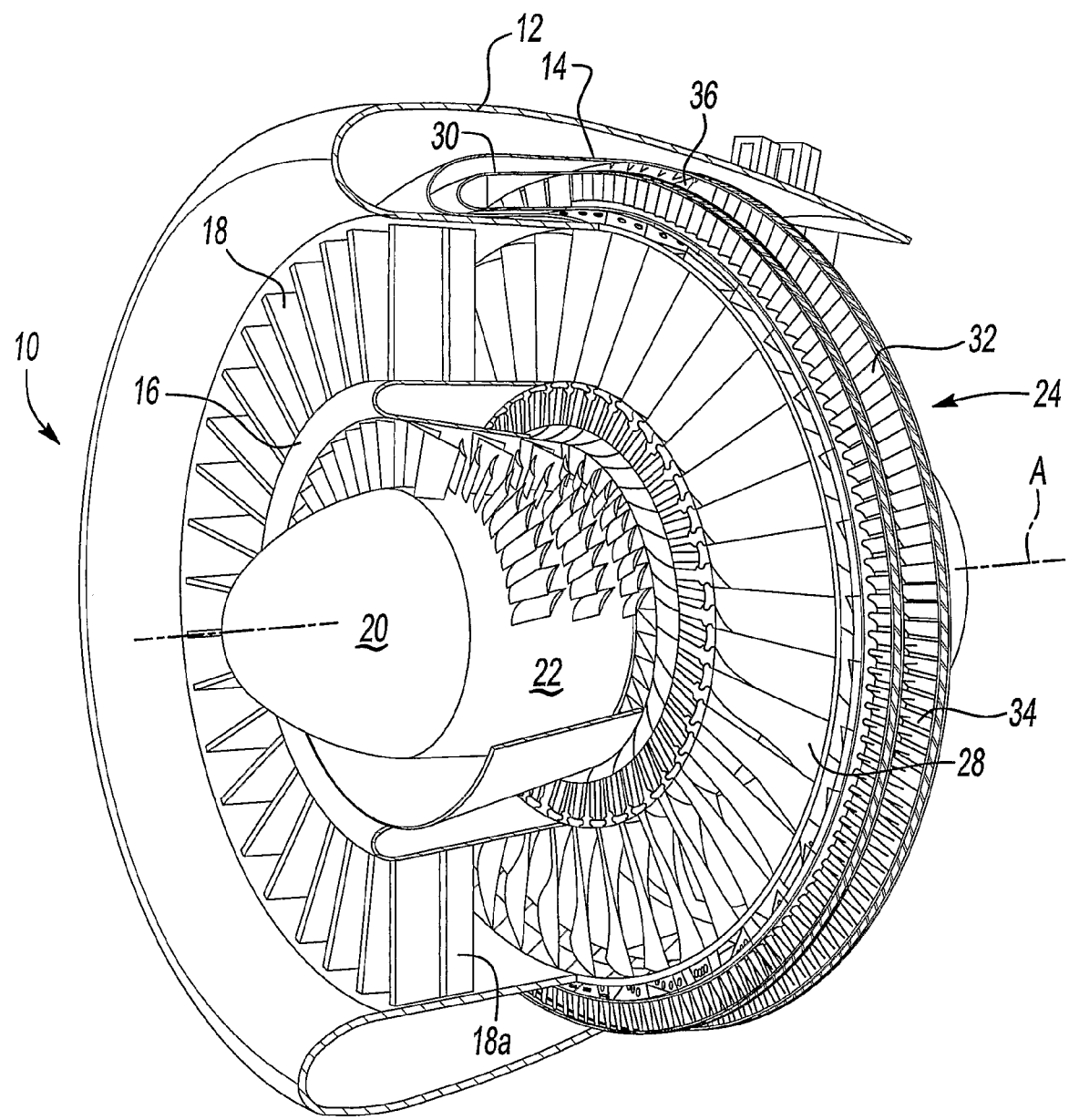
FIG. 1 is a partial sectional perspective view of a tip turbine engine.

FIG. 1 illustrates a general perspective partial sectional view of one embodiment of a tip turbine engine type gas turbine engine 10. The engine 10 includes an outer nacelle 12, a rotationally fixed static outer support structure 14 and a rotationally fixed static inner support structure 16. The engine 10 can also include a multitude of fan inlet guide vanes 18 mounted between the static outer support structure 14 and the static inner support structure 16. Each inlet guide vane 18 could include a separate variable trailing edge 18A which may be selectively articulated relative to the fixed inlet guide vane 18.

The engine 10 can have a nose cone 20 located along the engine centerline A to smoothly direct airflow near the engine centerline A radially outwardly and into the engine 10. The airflow enters the engine 10 through an axial compressor 22 ("core" or "primary" airflow) or through a fan-turbine rotor assembly 24 ("bypass" or "secondary" airflow). The axial compressor 22 is mounted about the engine centerline A behind the nose cone 20.

The fan-turbine rotor assembly 24 is mounted for rotation about the engine centerline A aft of the axial compressor 22. The fan-turbine rotor assembly 24 includes a multitude of hollow fan blades 28 to provide internal, centrifugal compression of the compressed core airflow exiting the axial compressor 22 for distribution to an annular combustor 30 located within the rotationally fixed static outer support structure 14.

A turbine 32 includes a multitude of tip turbine blades 34 (two stages shown) which rotatably drive the hollow fan blades 28 relative a multitude of tip turbine stators 36 which extend radially inwardly from the static outer support structure 14. Although two turbine stages are disclosed in the illustrated embodiment, it should be understood that any number of stages may be utilized by the instant invention. The annular combustor 30 is axially forward of the turbine 32 and discharges the combustion gases created by combusting a mixture of fuel and core airflow to the turbine 32.

Figure 2:
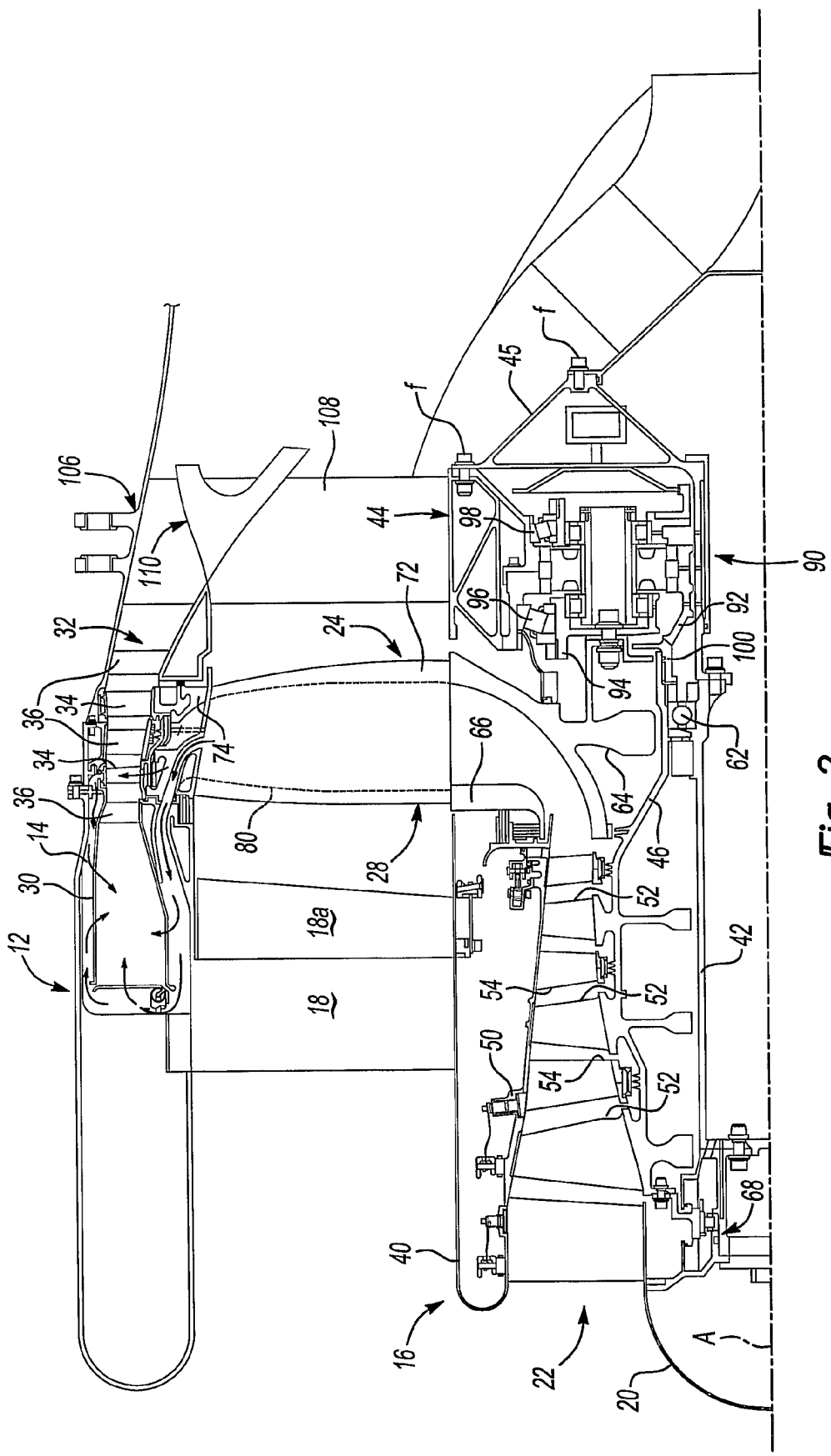
FIG. 2 is a longitudinal sectional view of a tip turbine engine along an engine centerline.

Referring to FIG. 2, the rotationally fixed static inner support structure 16 includes a splitter 40, a static inner support housing 42 and an static outer support housing 44 located coaxial to said engine centerline A. An aft housing 45 can be attached to the static inner support housing 42 and the static outer support housing 44 through fasteners f such as bolts or the like. The static inner support housing 42, the static outer support housing 44, and the aft housing 45 are located about the engine centerline A to provide the non-rotating support structure for the engine 10.

The axial compressor 22 includes the axial compressor rotor 46 from which a plurality of compressor blades 52 extend radially outwardly and a compressor case 50. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a multitude of the hollow fan blades 28. Each fan blade 28 includes an inducer section 66, a hollow fan blade section 72 and a diffuser section 74. The inducer section 66 receives core airflow from the axial compressor 22 generally parallel to the engine centerline A and turns the core airflow from an axial direction toward a radial direction. The core airflow is radially communicated through a core airflow passage 80 within the fan blade section 72 where the airflow is centrifugally compressed. From the core airflow passage 80, the core airflow is again turned, then diffused by the diffuser section 74. The core airflow is now directed in an axial direction toward the annular combustor 30. Preferably the core airflow is diffused axially forward in the engine 10, however, the airflow may alternatively be communicated in another direction.

A gearbox assembly 90 aft of the fan-turbine rotor assembly 24 can provide a speed increase between the fan-turbine rotor assembly 24 and the axial compressor 22. Alternatively, the gearbox assembly 90 could provide a speed decrease between the fan-turbine rotor assembly 24 and the axial compressor rotor 46. The gearbox assembly 90 is mounted for rotation between the static inner support housing 42 and the static outer support housing 44. The gearbox assembly 90 includes a sun gear shaft 92 which rotates with the axial compressor 22 and a planet carrier 94 which rotates with the fan-turbine rotor assembly 24 to provide a speed differential therebetween. The gearbox assembly 90 is preferably an epicyclic gearbox that provides co-rotating or counter-rotating rotational engagement between the fan-turbine rotor assembly 24 and an axial compressor rotor 46. The gearbox assembly 90 is mounted for rotation between the sun gear shaft 92 and the static outer support housing 44 through a forward bearing 96 and a rear bearing 98. The forward beating 96 and the rear bearing 98 are both tapered roller bearings and both handle radial loads. The forward bearing 96 handles the aft axial loads while the rear bearing 98 handles the forward axial loads. The sun gear shaft 92 is rotationally engaged with the axial compressor rotor 46 at a splined interconnection 100 or the like.

In operation, core airflow enters the axial compressor 22, where it is compressed by the three stages of the compressor blades 52 and compressor vanes 54. The compressed air from the axial compressor 22 enters the inducer section 66 in a direction generally parallel to the engine centerline A and is turned by the inducer section 66 radially outwardly through the core airflow passage 80 of the hollow fan blades 28. The core airflow is further compressed centrifugally in the hollow fan blades 28 by rotation of the hollow fan blades 28. From the core airflow passage 80, the core airflow is turned and diffused axially forward in the engine 10 into the annular combustor 30. The compressed core airflow from the hollow fan blades 28 is mixed with fuel in the annular combustor 30 and ignited to form a high-energy gas stream. The high-energy gas stream is expanded over the multitude of tip turbine blades 34 mounted about the outer periphery of the fan blades 28 to drive the fan-turbine rotor assembly 24. The fan-turbine rotor assembly 24 in turn drives the axial compressor 22 through the gearbox assembly 90. Concurrent therewith, the fan-turbine rotor assembly 24 compresses then discharges the bypass air axially aft to merge with the core airflow from the turbine 32 in an exhaust case 106. A multitude of exit guide vanes 108 are located between the static outer support housing 44 and the nonrotatable static outer support structure 14 to guide the combined airflow out of the engine 10 to provide forward thrust. An exhaust mixer 110 mixes the core airflow from the turbine blades 34 with the bypass airflow through the fan blades 28.

Figure 3:
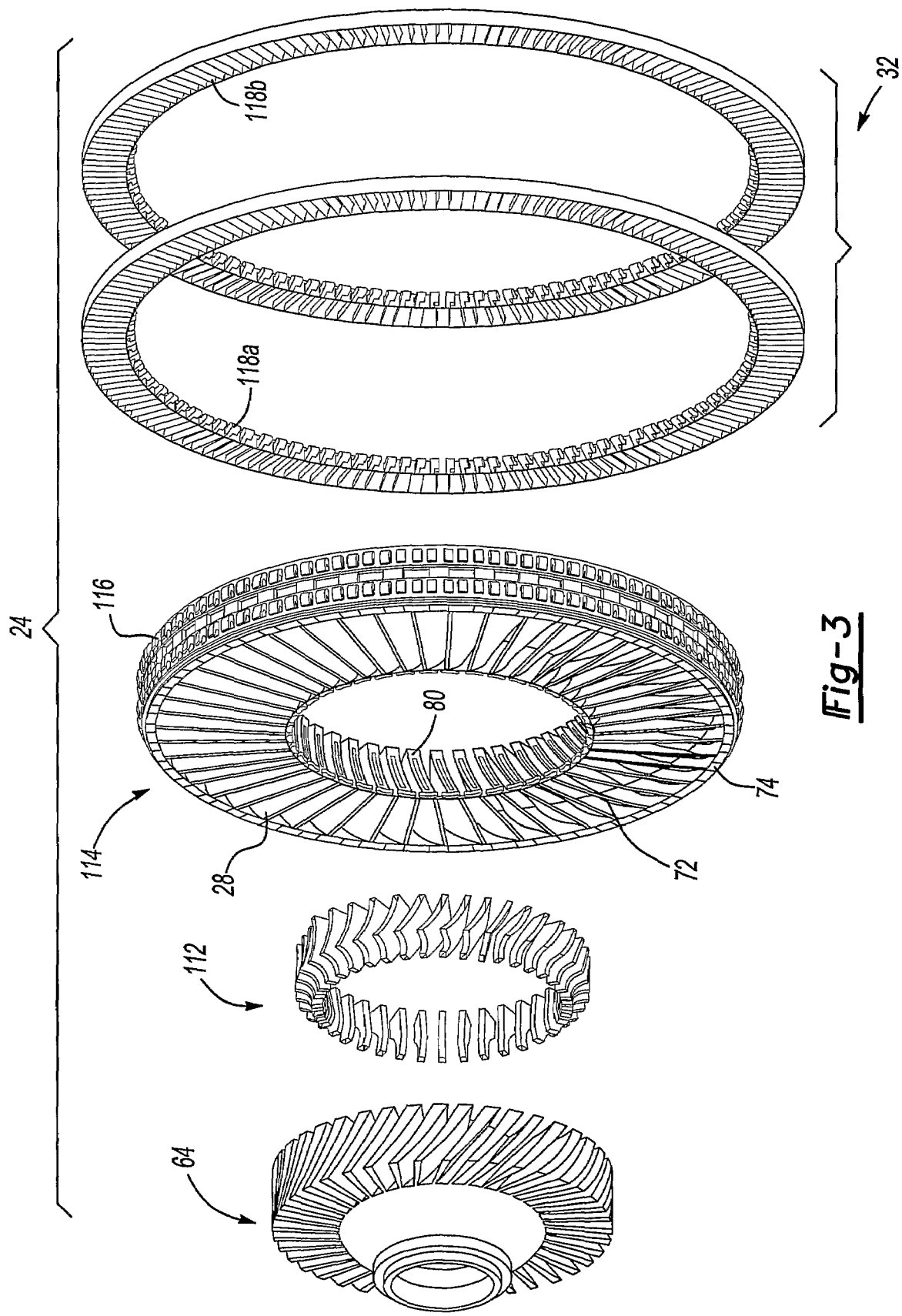
FIG. 3 is an exploded view of a fan-turbine rotor assembly.
Figure 4:
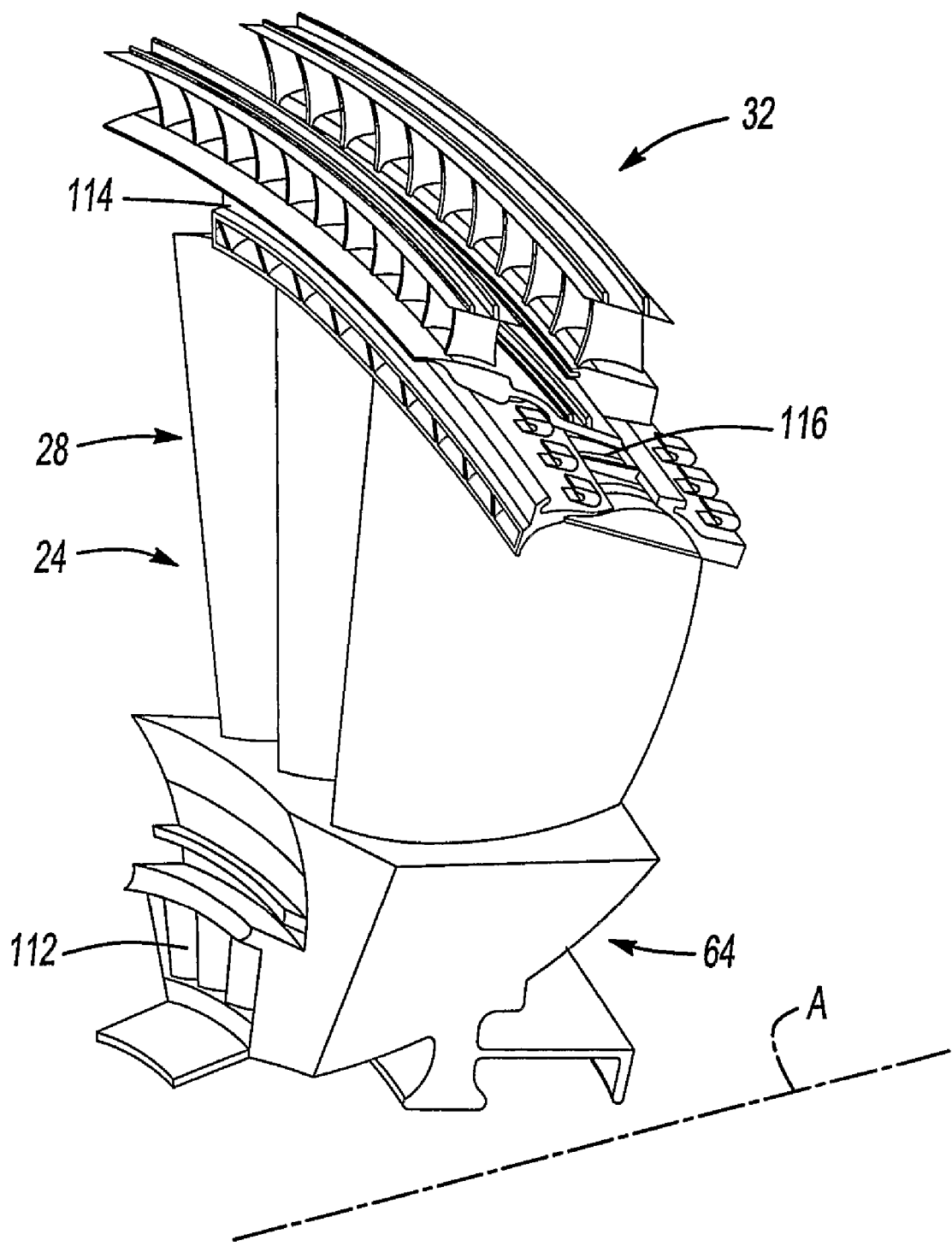
FIG. 4 is an expanded partial perspective view of a fan-turbine rotor assembly.

Referring to FIG. 3, the fan-turbine rotor assembly 24 is illustrated in an exploded view. The fan hub 64 is the primary structural support of the fan-turbine rotor assembly 24 (also illustrated as a partial sectional view in FIG. 4). The fan hub 64 supports an inducer 112, the multitude of fan blades 28, a diffuser 114, and at least one stage of the turbine 32.

Figure 5:
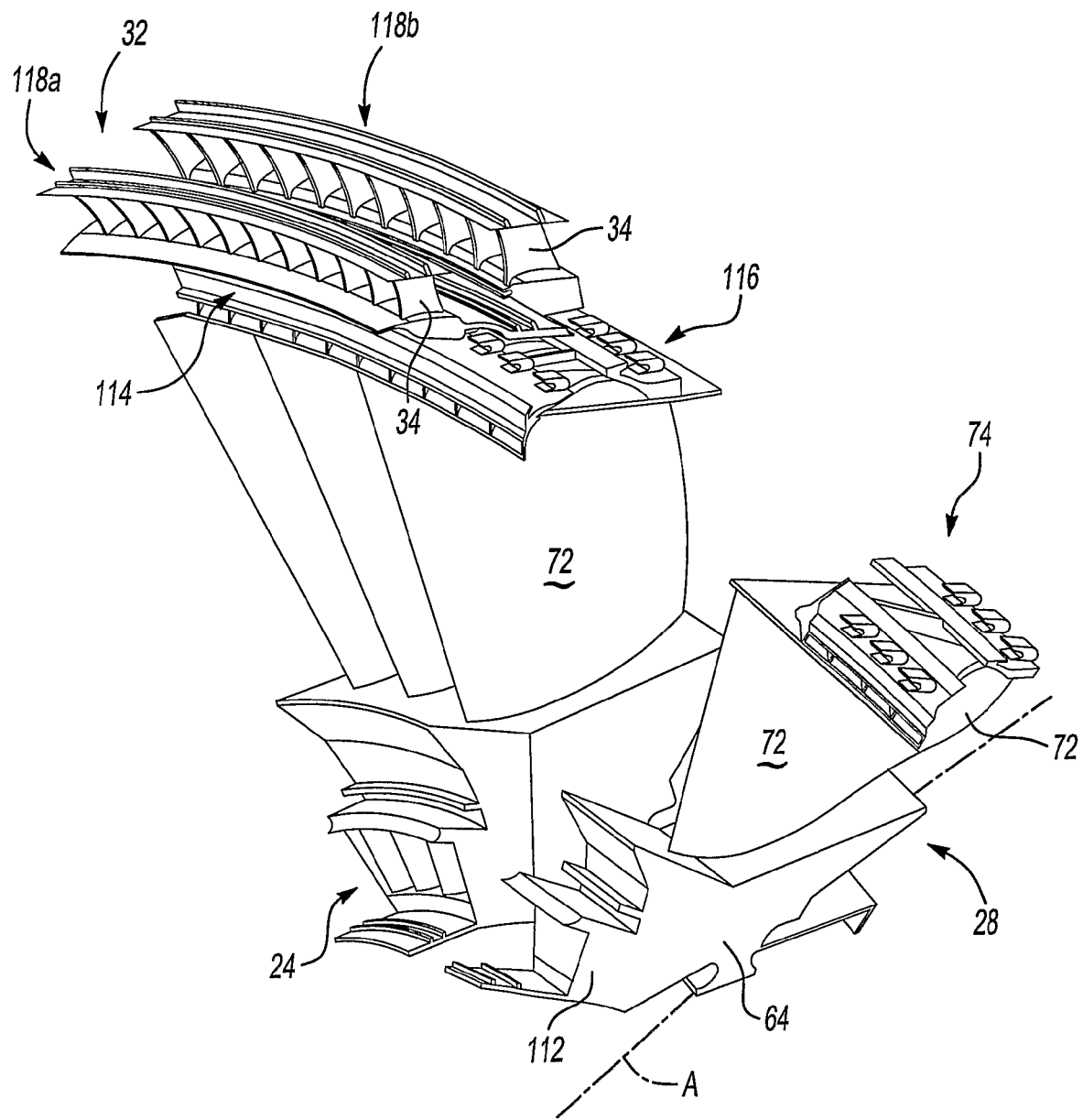
FIG. 5 is an expanded partial perspective view of a fan-turbine rotor assembly illustrating a separated single fan blade segment.
Figure 6A:
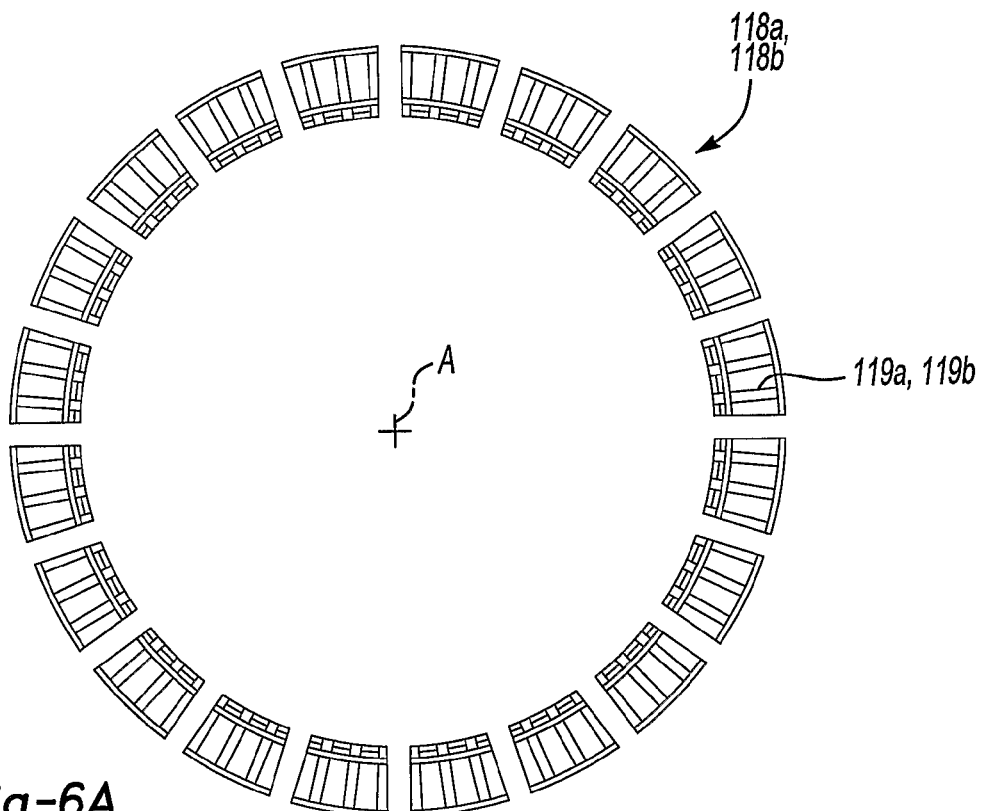
FIG. 6A is a front view of a segmented turbine rotor ring.
Figure 6B:
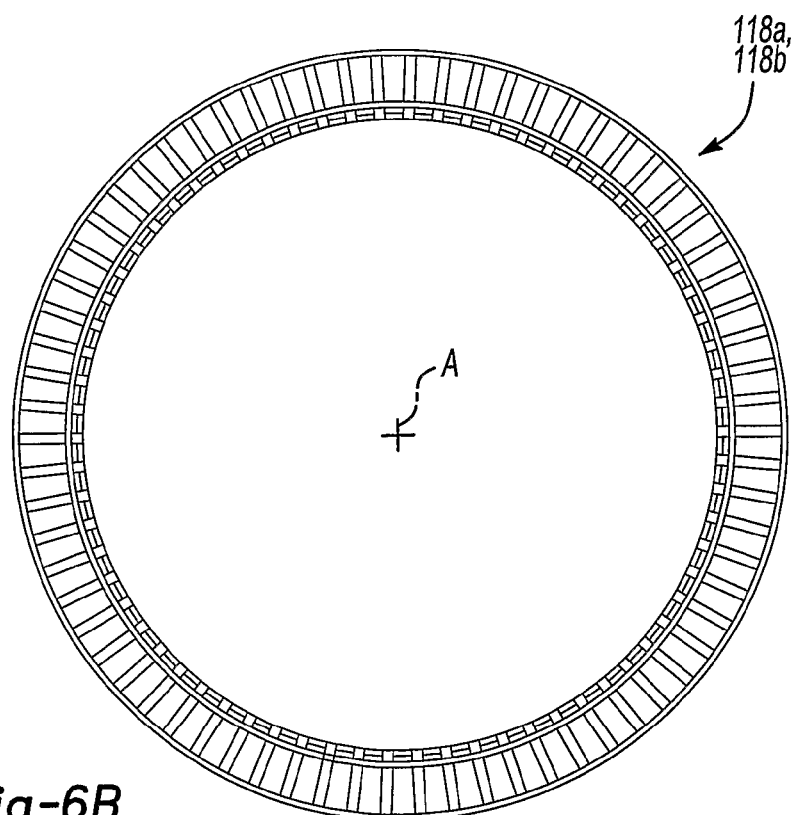
FIG. 6B is an expanded exploded view of a turbine rotor ring.

Referring to FIG. 5, the diffuser 114 defines a diffuser surface 116 formed by the multitude of diffuser sections 74. The diffuser surface 116 is formed about the radial outer periphery of the fan blade sections 72 to provide structural support to the outer tips of the fan blade sections 72 and to turn and diffuse the airflow from the radial core airflow passage 80 toward an axial airflow direction. The turbine 32 is mounted to the diffuser surface 116 as one or more turbine ring rotors 118a, 118b (FIG. 6B) which could be assembled from a multitude of turbine blade clusters 119a, 119b (FIG. 6A).

Preferably, each fan blade section 72 includes an attached diffuser section 74 such that the diffuser surface 116 is formed when the fan-turbine rotor 24 is assembled. It should be understood, however, that the fan-turbine rotor assembly 24 may be formed in various ways including casting multitude sections as integral components, individually manufacturing and assembling individually manufactured components, and/or other combinations thereof.

Referring to FIG. 6, a multitude of the turbine blade clusters 119a, 119b respectively can form the turbine ring rotor 118a, 118b defined about the engine centerline A. Alternative methods of manufacturing the rotors 118a, 118b are possible, including casting each rotor 118a, 118b in one piece. As discussed herein, turbine rotor ring 118a is a first stage of the turbine 32, and turbine ring 118b is a second stage of the turbine 32, however, other turbine stages will likewise benefit from the present invention. Furthermore, gas turbine engines other than tip turbine engines will also benefit from the present invention.

Figure 7A:
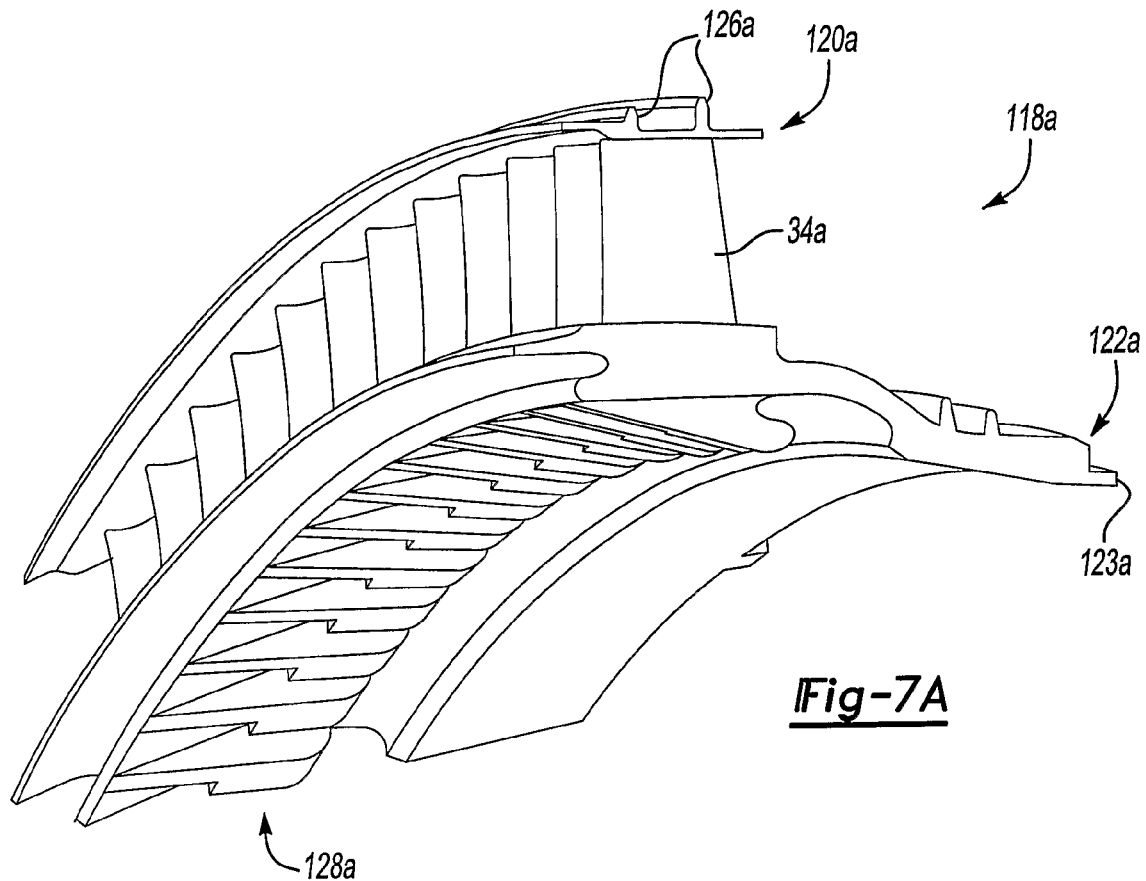
FIG. 7A is an expanded perspective view of a segment of a first stage turbine rotor ring.
Figure 7B:
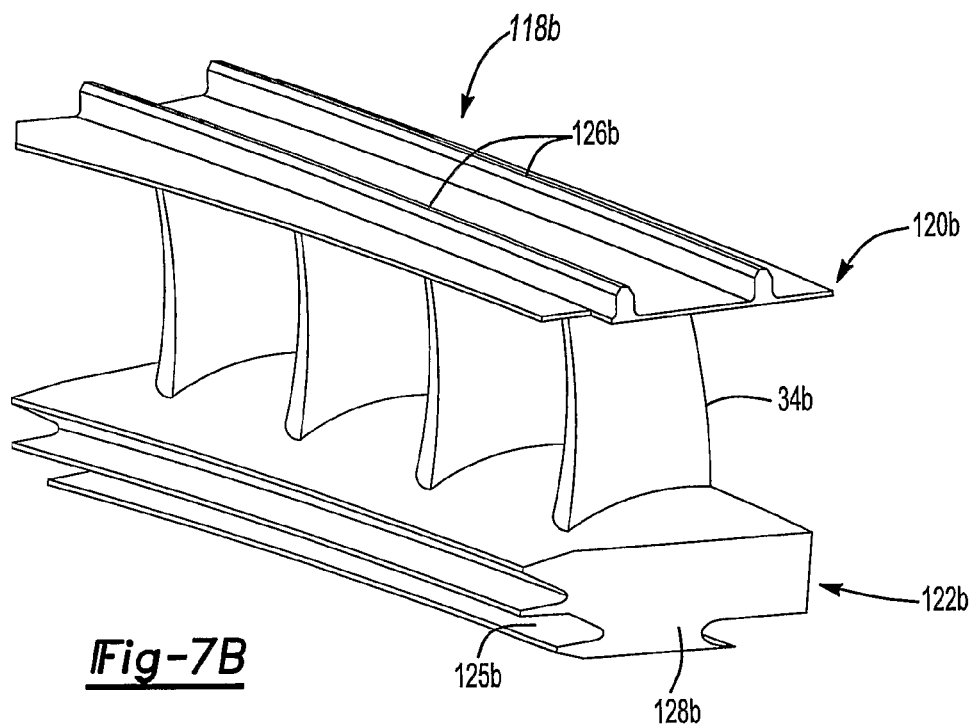
FIG. 7B is an expanded perspective view of a segment of a second stage turbine rotor ring.

Referring to FIGS. 7A and 7B, each turbine blade cluster 119a, 119b includes an arcuate tip shroud 120a, 120b, at a radially outer location, an arcuate base 122a, 122b and a multitude of turbine blades 34a, 34b mounted between the arcuate tip shroud 120a, 120b and the arcuate base 122a, 122b, respectively. The arcuate tip shroud 120a, 120b and the arcuate base 122a, 122b define generally flat planar rings which extend axially about the engine centerline A. The arcuate tip shroud 120a, 120b and the arcuate base 122a, 122b provide support and rigidity to the multitude of turbine blades 34a, 34b.

The arcuate tip shroud 120a, 120b each include a tip seal 126a, 126b extending therefrom. The tip seal 126a, 126b preferably extend perpendicular to the arcuate tip shroud 120a, 120b to provide a knife edge seal between the turbine ring rotor 118a, 118b and the nonrotatable static outer support structure 14 (also illustrated in FIG. 8) during rotation of the turbine ring rotors 118a, 118b. It should be understood that seal arrangements other than knife seals may alternatively or additionally be utilized.

Figure 8:
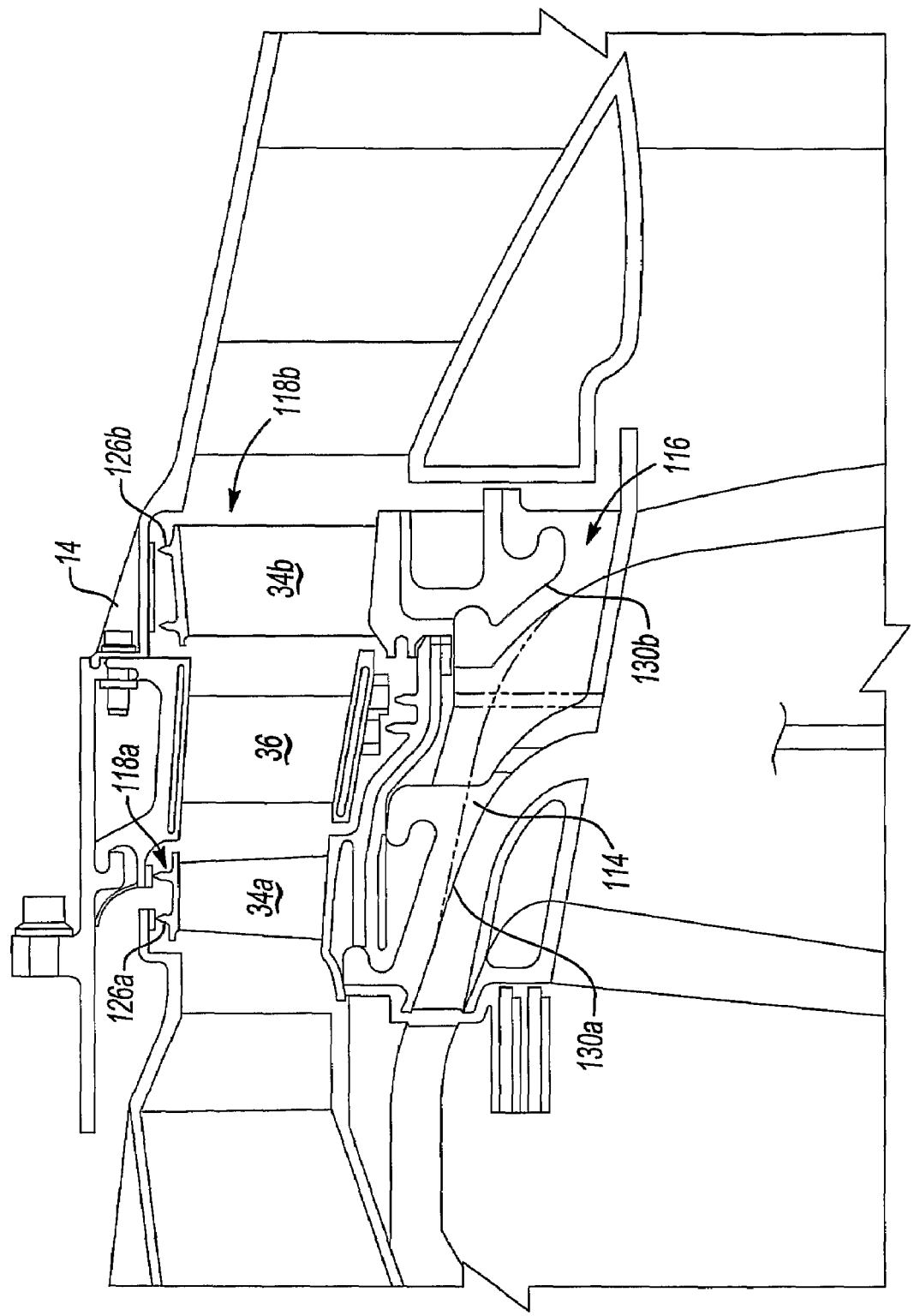
FIG. 8 is a side planar view of a turbine for a tip turbine engine.
Figure 9:
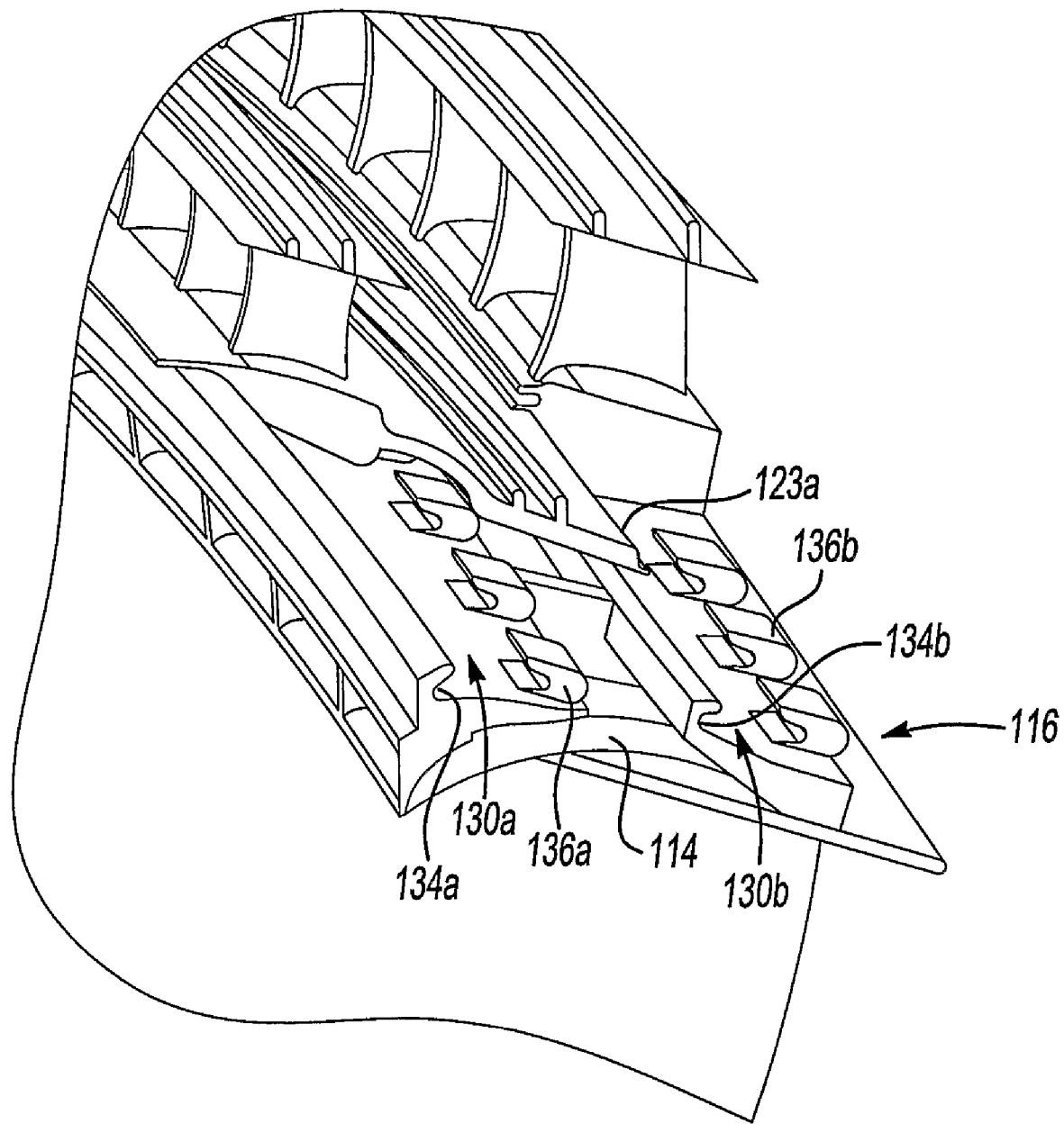
FIG. 9 is an expanded perspective view of a first stage and a second stage turbine rotor ring mounted to a diffuser ring of a fan-turbine rotor assembly.

The arcuate base 122a, 122b includes attachment lugs 128a, 128b. The attachment lugs 128a, 128b are preferably segmented to provide installation by axial mounting and radial engagement of the turbine ring rotor 118a, 118b to the diffuser surface 116 as will be further described. The attachment lugs 128a, 128b preferably engage a segmented attachment slot 130a, 130b formed in the diffuser surface 116 in a dovetail-type, bulb-type or fir tree-type engagement (FIG. 8). The segmented attachment slots 130a, 130b preferably include a continuous forward slot surface 134a, 134b and a segmented aft slot surface 136a, 136b (FIG. 9).

The arcuate base 122a preferably provides an extended axial stepped ledge 123a which engages a seal surface 125b which extends from the arcuate base 122b. That is, arcuate bases 122a, 122b provide cooperating surfaces to seal an outer surface of the diffuser surface 116 (FIG. 9).

Figure 10A:
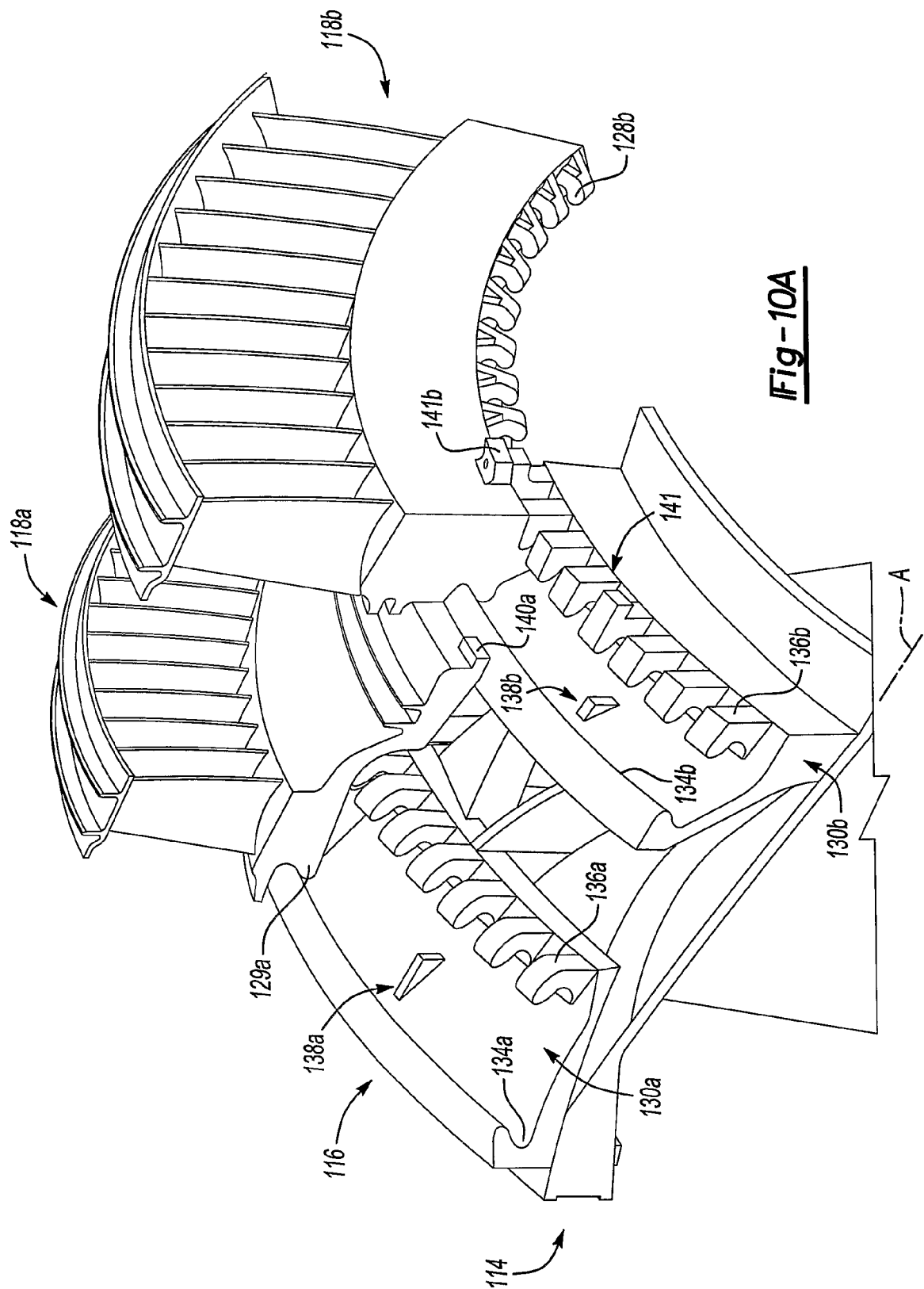
FIG. 10A is an expanded perspective view of a first stage and a second stage turbine rotor ring in a first mounting position relative to a diffuser ring of a fan-turbine rotor assembly.

Referring to FIG. 10A, assembly of the turbine 32 to the diffuser surface 116 will be describe with reference to the turbine ring rotors 118a, 118b which include a multitude of separate turbine blade clusters 119a, 119b (FIG. 6A). Assembly of the blade clusters 119a, 119b to the diffuser surface 116, begins with one of the first stage turbine blade cluster 119a which is first axially mounted from the rear of the diffuser surface 116. The forward attachment lug engagement surface 129a is engaged with the continuous forward slot engagement surface 134a by passing the attachment lugs 128a through the segmented aft slot surface 136a. That is, the attachment lugs 128a are aligned to slide through the lugs of the segmented aft slot surface 136a. All first stage clusters 119a are then installed in this fashion. Next, one of the second stage blade clusters 119b is axially mounted from the rear of the diffuser surface 116. The forward attachment lug engagement surface 129a is engaged with the continuous forward slot engagement surface 134b by passing the attachment lugs 128b through the segmented aft slot surface 136b. That is, the attachment lugs 128b are aligned to slide between the lugs of the segmented aft slot surface 136b.

Figure 10B:
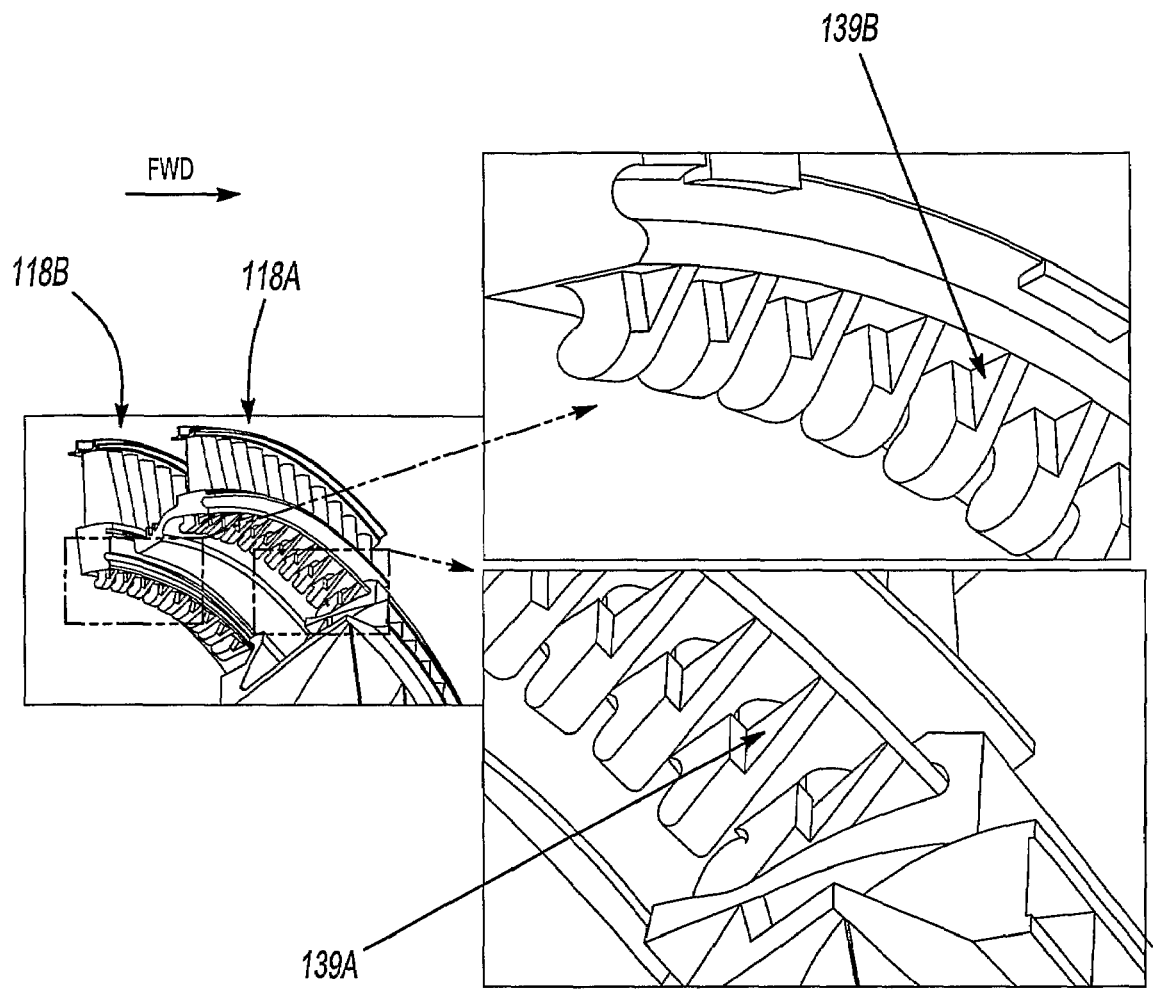
FIG. 10B is an expanded perspective view of a first stage and a second stage turbine rotor ring illustrating turbine torque load surface on each turbine rotor ring.

The extended axial stepped ledge 123a of the arcuate base 122a receives the seal surface 125b of the arcuate base 122b. The second stage turbine blade cluster 119b rotationally locks with the first stage turbine blade cluster 119a through engagement between anti-backout tabs 140a and anti-backout slots 140b (also illustrated in FIG. 10D). The remaining second stage airfoil clusters 119b are installed in the same manner.

A multitude of radial stops 138a, 138b are located upon the diffuser surface 116 to correspond with each of the turbine blade clusters 119a, 119b. Once all of the pairs of clusters 119a, 119b are installed the turbine ring rotors 118a, 118b are completed. The turbine ring rotors 118a, 118b are then rotated as a unit within the segmented attachment slot 130a, 130b so that a torque load surface 139a, 139b (FIGS. 10B-10C) on each turbine cluster 119a, 119b contacts a radial stop 138a, 138b to radially locate the attachment lugs 128a, 128b adjacent the lugs of the segmented aft slot surface 136a, 136b of the segmented attachment slots 130a, 130b.

Preferably, the completed turbine ring rotors 118a, 118b are rotated together toward the radial stops 138a, 138b in a direction which will maintain the turbine ring rotors 118a, 118b against the radial stops 138a, 138b during operation. It should be understood that a multitude of torque load surface 139a, 139b and radial stop 138a, 138b may be located about the periphery of the diffuser surface 116 to restrict each turbine blade cluster 119a, 119b. It should be further understood that other locking arrangements may also be utilized.

Figure 10C:
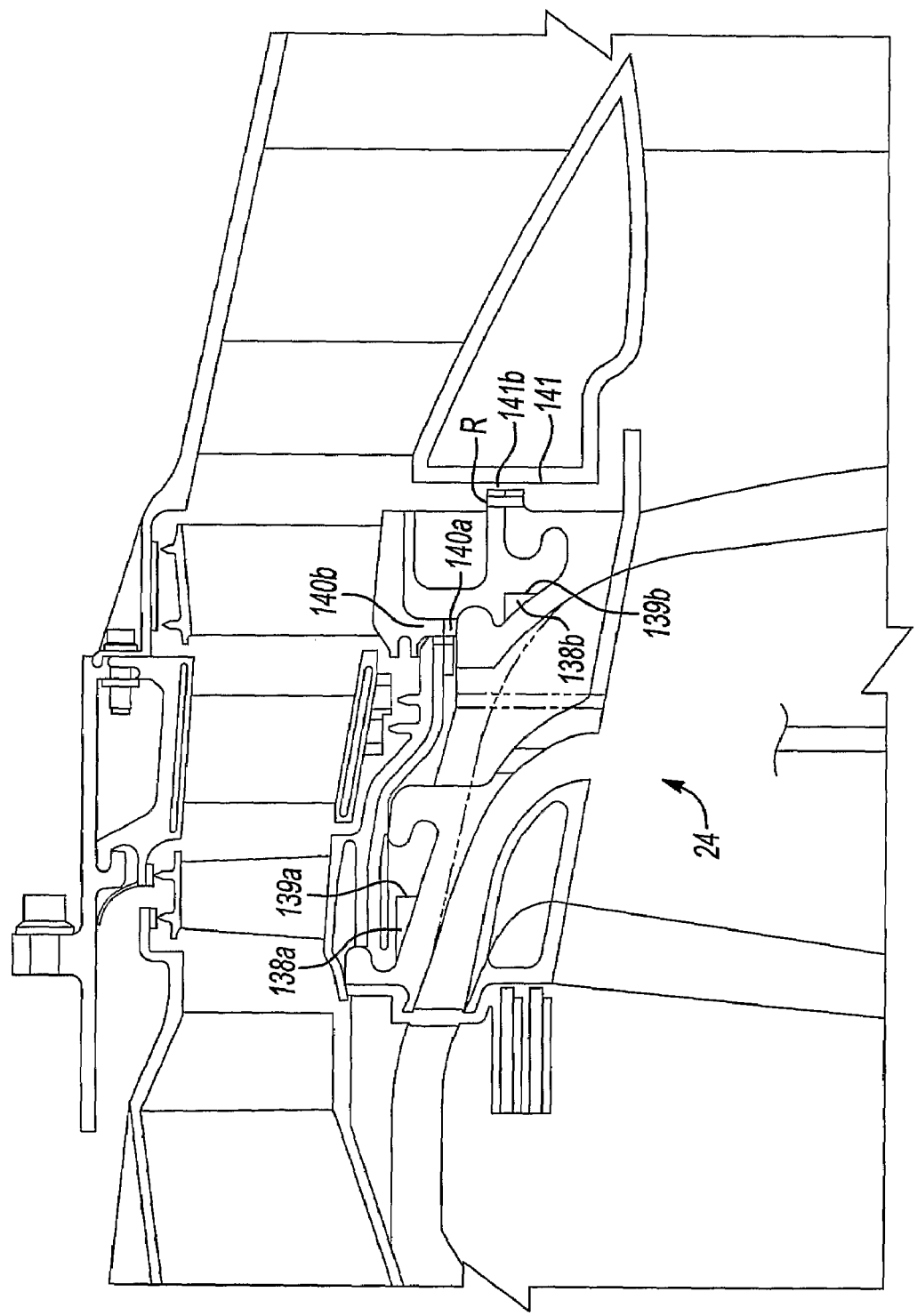
FIG. 10C is a side sectional view of a first stage and a second stage turbine rotor ring illustrating the interaction of the turbine torque load surfaces and adjacent stops.
Figure 10D:
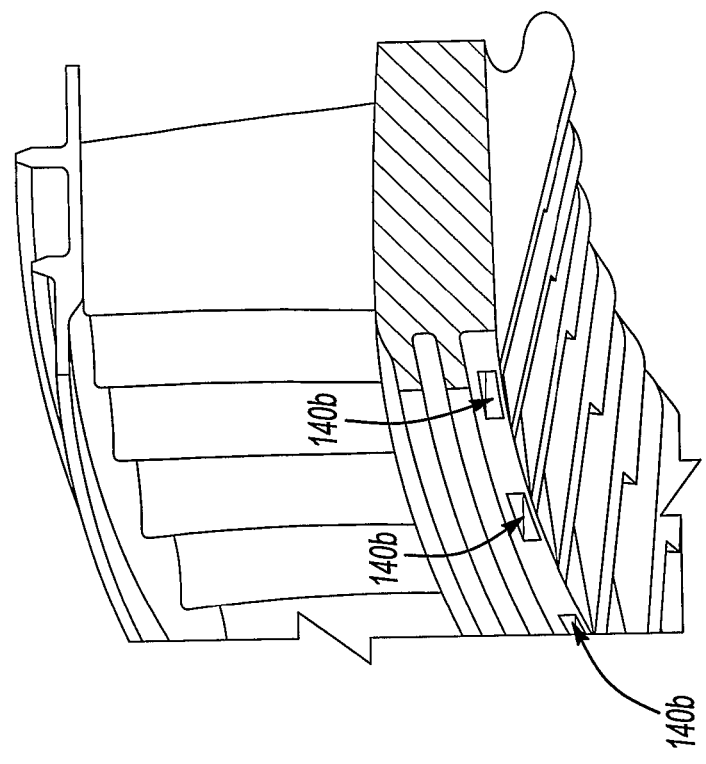
FIG. 10D is an expanded perspective view of a first stage and a second stage turbine rotor ring illustrating the anti-back out tabs and anti-back out slots to lock the first stage and a second stage turbine rotor ring.
Figure 10D:
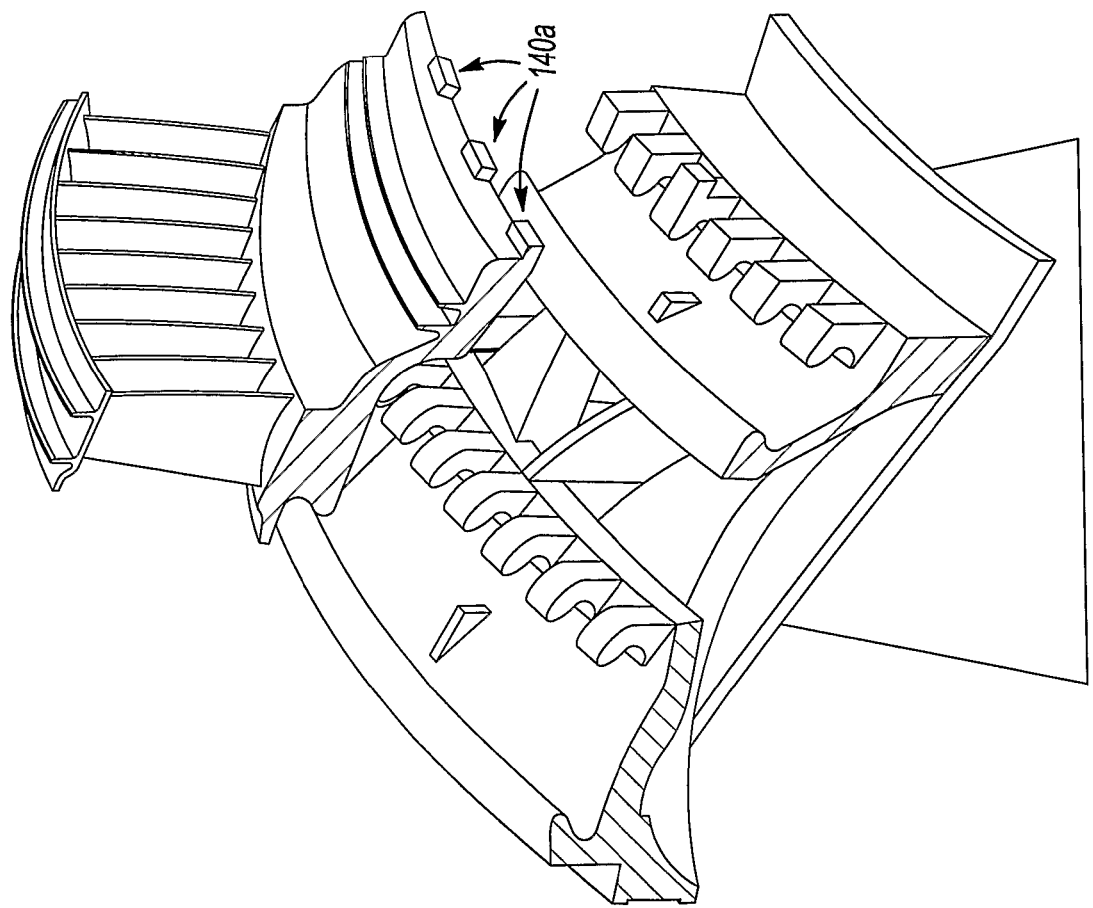

Once the turbine ring rotors 118a, 118b are rotated, a second stage turbine ring anti-backout retainer tab 141b which extends from each of the second stage blade clusters 119b is aligned with an associated anti-backout retainer tab 141 which extends from the diffuser surface 116. A multitude of anti-backout retainer tabs 141 are located about the diffuser surface 116 to correspond with each of the turbine blade clusters 119b. The turbine ring anti-backout retainer tabs 141b and the anti-backout retainer tabs 141 are locked together through a retainer R such as screws, peening, locking wires, pins, keys, and/or plates as generally known. The turbine ring rotors 118a, 118b are thereby locked radially together and mounted to the fan-turbine rotor assembly 24 (FIG. 10C).

Figure 11A:
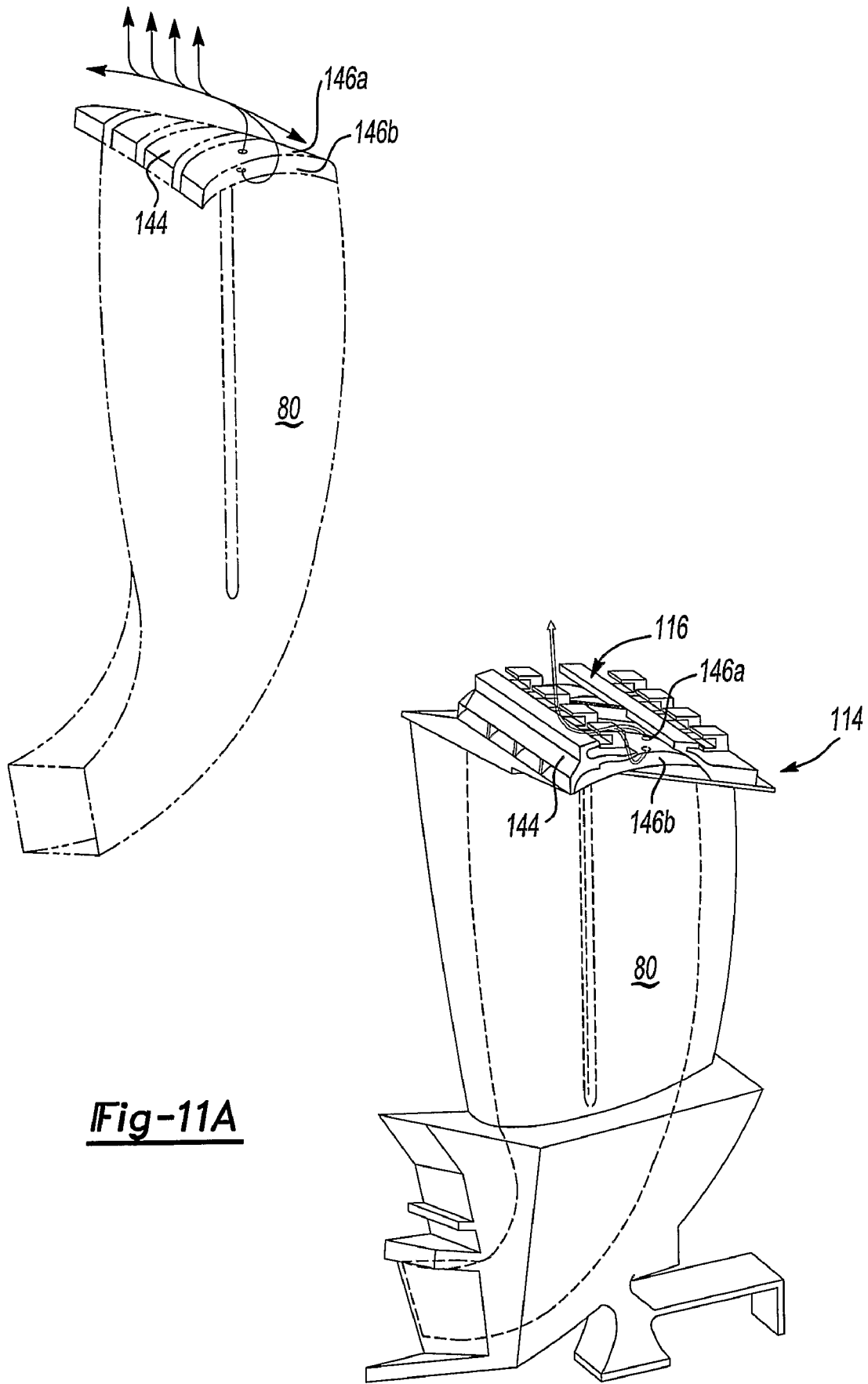
FIG. 11A is a partial phantom view of a single fan blade illustrating the diffuser section and aspirated flow therefrom.

Referring to FIG. 11A, the diffuser 114 defines a multitude of diffuser passages 144 (also illustrated in FIGS. 11B-11D) which turn and diffuse the airflow from the radial core airflow passage 80 toward an axial airflow direction. Each core airflow passage 80 communicates with one of the multiple of diffuse passages 144 to direct the core airflow from the radial direction to an axial airflow direction, here illustrated as toward the front of the engine 10. A multitude of diffuser aspiration ports 146a, 146b (FIGS. 11B-11C) provide communication from within the diffuser 114. The diffuser passage 144 aspirates a diffuser annulus 117 (FIG. 11D) that is formed between the diffuser surface 116 and turbine clusters 119a, 119b. That is, the diffuser annulus 117 is sealed by the turbine clusters 119a, 119b when mounted to the diffuser surface 116.

Inside the diffuser annulus 117, the airflow from each core airflow passage 80 from each blade section 72 commingle. The diffuser annulus 117 permits the airflow within the diffuser passages 144 to equalize the potentially unbalanced core airflow from each core airflow passage 80 from each blade section 72. A structural diffuser wall 115 may be located within the diffuser annulus 117 to provide support therefore. The structural diffuser wall 115 (FIGS. 11B, 11C) may alternatively be perforated to facilitate commingling of flow within the diffuser annulus 117.

Figure 12A:
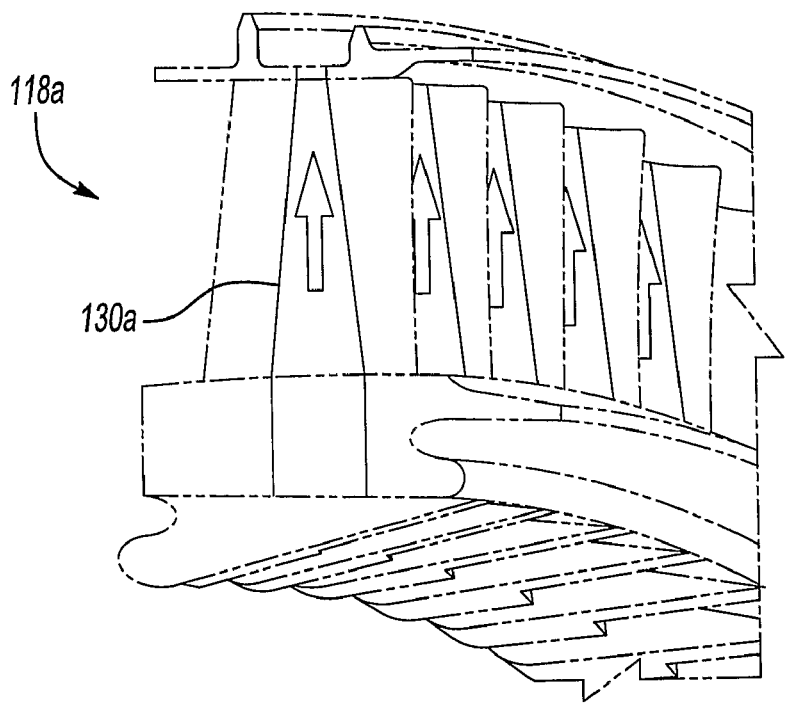
FIG. 12A is an expanded perspective view of a segment of a first stage turbine rotor ring illustrating an airflow passage through a turbine blade.

The diffuser aspiration ports 146a, 146b communicate with a first stage turbine passages 150a (FIG. 12A). It should be understood that although the ports 146a, 146b are illustrated as communicating with just the first stage passage 150a, the ports 146a, 146b may alternatively or additionally communicate with a second stage turbine passage 150b (FIG. 12B) as well as other turbine stages and engine components which may require a relatively cool airflow.

Figure 11B:
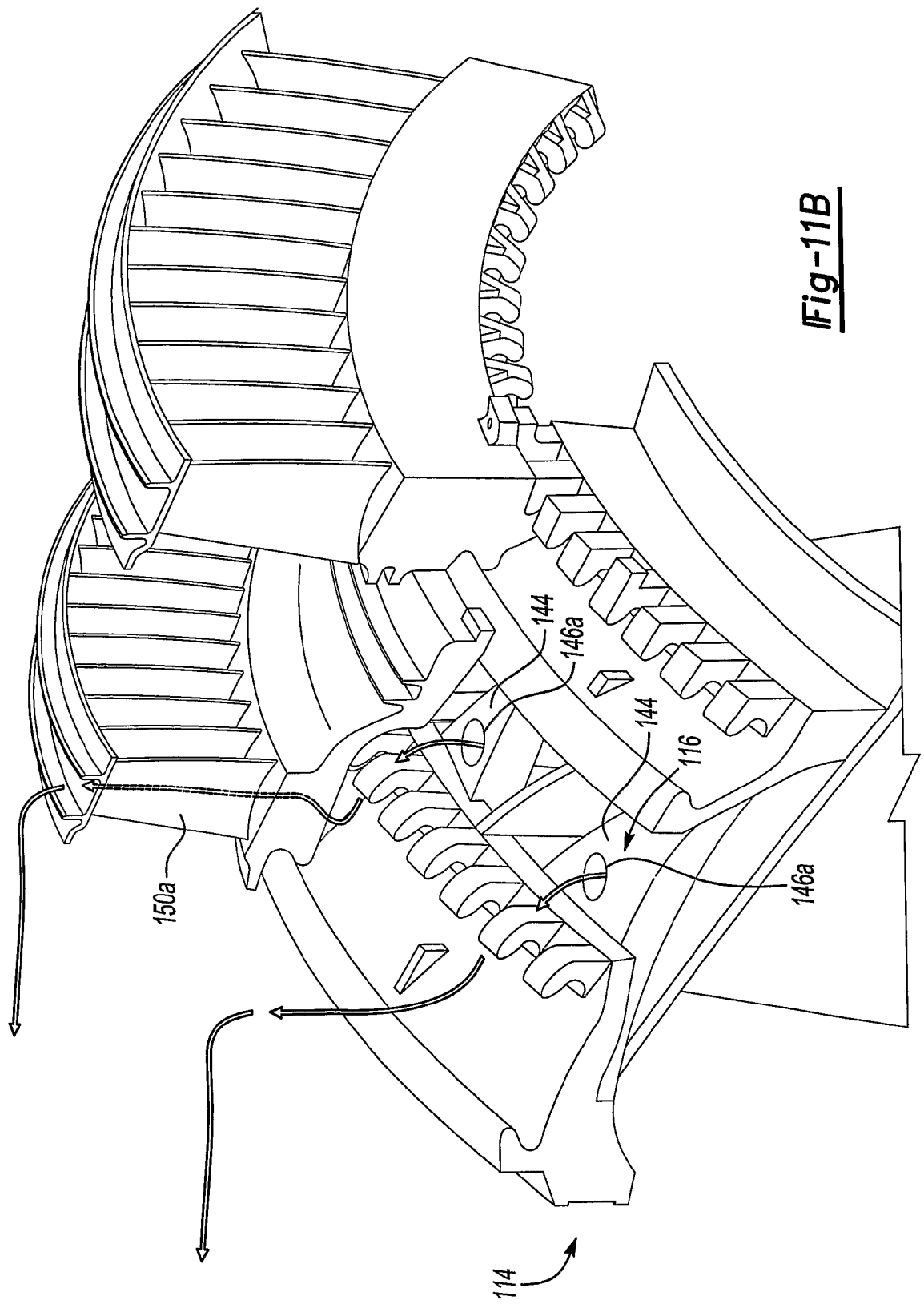
FIG. 11B is a expanded view of a diffuser section illustrating an outer diameter aspirated flow passage.
Figure 12B:
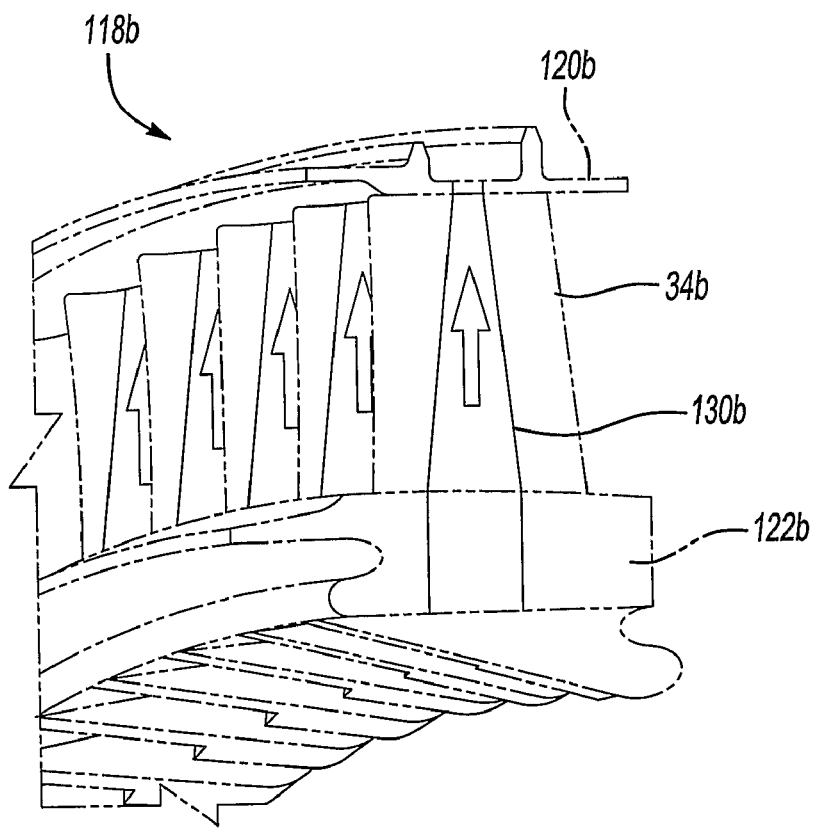
FIG. 12B is an expanded perspective view of a segment of a second stage turbine rotor ring illustrating an airflow passage through a turbine blade.

Referring to FIG. 11B, the diffuser aspiration ports 146a, 146b are preferably located though an upper and lower surface of each of the diffuser passages 144. As the diffuser aspiration ports 146a, 146b are located through an outer diameter wall of the diffuser passages 144, the aspiration airflows need not commingle and may be partitioned from each core airflow passage 80 from each blade section 72 to provide a controlled flow into each turbine clusters 119a, 119b (FIGS. 12A, 12B).

Figure 11C:
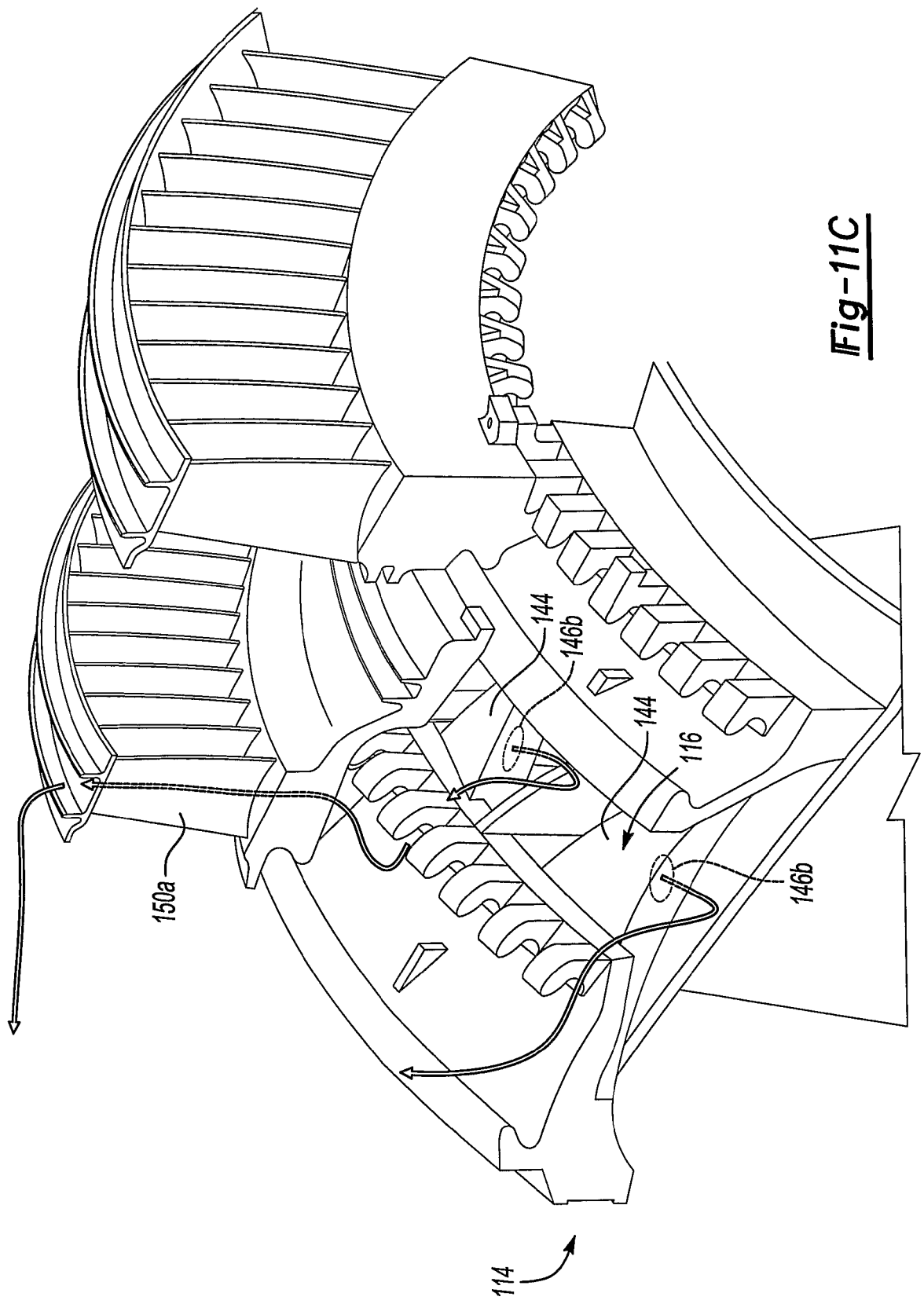
FIG. 11C is a expanded view of a diffuser section illustrating an inner diameter aspirated flow passage.
Figure 11D:
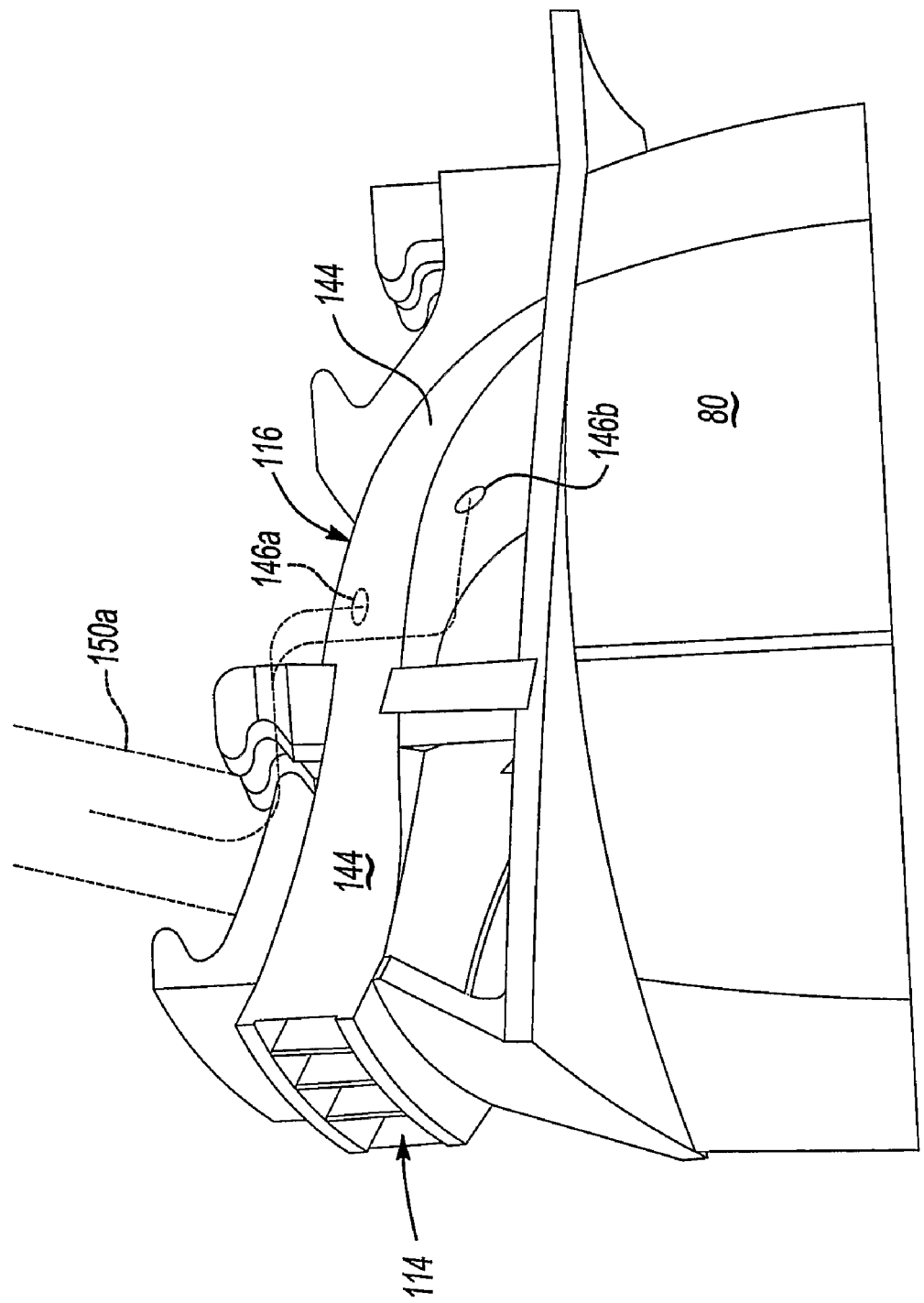
FIG. 11D is a sectional view through a diffuser section illustrating the inner and outer diameter aspirated flow passages.

Referring to FIG. 11C, the diffuser aspiration passages 146b are preferably located though an inner surface of the diffusers passages 144. The aspirated airflow generally exits from the underside of the diffuser passages 144 and flows around the edge of the diffuser passages 144 (also illustrated as a dashed line in FIG. 13A, 13B). The aspiration airflows need not commingle. The geometry is such that the exit route for the aspirated airflow is over the top of an adjacent diffuser passage 144.

Preferably, the diffuser aspiration ports 146a, 146b communicate airflow from each of the diffuser passages 144 at a location which reduces separation of the airflow as the airflow is turned from the radial core airflow passage 80 toward an axial airflow direction. That is, the diffuser aspiration ports 146a, 146b minimize turbulence and flow separation of the airflow which is passing through the diffuser passages 144 through aspiration at potentially turbulent locations. That is, the diffuser aspiration ports 146a, 146b not only provide regenerative cooling airflow, but also improve the efficiency of the diffuser 114.

Figure 13A:
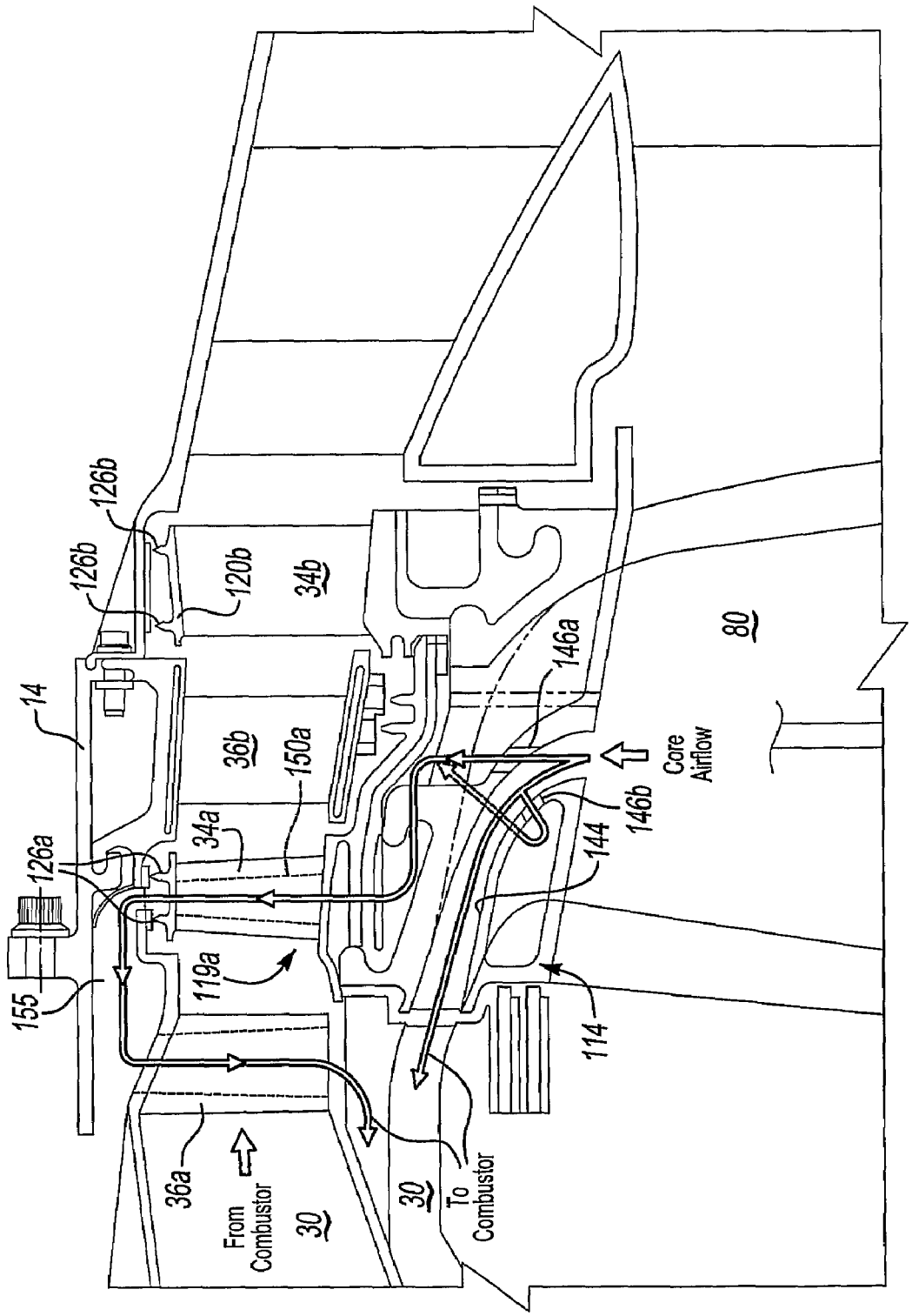
FIG. 13A is a side sectional view of a turbine for a tip turbine engine illustrating regenerative airflow paths through the turbine.

Referring to FIG. 13A, the regenerative cooling airflow is communicated from the radial core airflow passage 80 through the diffuser passages 144, through the diffuser aspiration ports 146a, 146b and into the turbine blade passage 150a. For further clarity, it should be noted that what appears in the cross section of FIG. 13A to be two aspiration chambers is one continuous chamber. The continuous chamber is at an angle and the cross-section of FIG. 13A shows the respective parts of two chambers that are continuous with each other and all other chambers which is the diffuser annulus 117.

The turbine blade passage 150a receives airflow from the diffuser aspiration ports 146a, 146b to provide for regenerative cooling airflow. Each of the multitude of turbine blades 34a defines respective turbine blade passage 150a, which extend through the arcuate tip shroud 120a and the arcuate base 122a, respectively. The regenerative cooling airflow receives thermal energy from each of the turbine blades 34a and exits through the arcuate tip shroud 120a. The regenerative cooling airflow also increases the centrifugal compression within the turbine 32 while transferring the increased temperature cooling airflow into the annular combustor 30 to increase the efficiency thereof through regeneration.

The regenerative cooling airflow which exits through the arcuate tip shroud 120a communicates the received thermal energy from the turbine blades 34a through an axial static passage 155 within the static outer support structure 14. From the axial static passage 155, the airflow utilized to receive thermal energy from the turbine blades 34a is communicated through a forward turbine stator 36a and into the annular combustor 30 with the relatively cooler airflow which is directly exiting the core diffuser passage 144. It should be understood that the ports 146a, 146b, and the axial static passage 155 are peripherally located at a multitude of locations about the engine centerline A. Furthermore, it should be noted that various paths to the combustor 30 may also be utilized with the present invention.

Figure 13B:
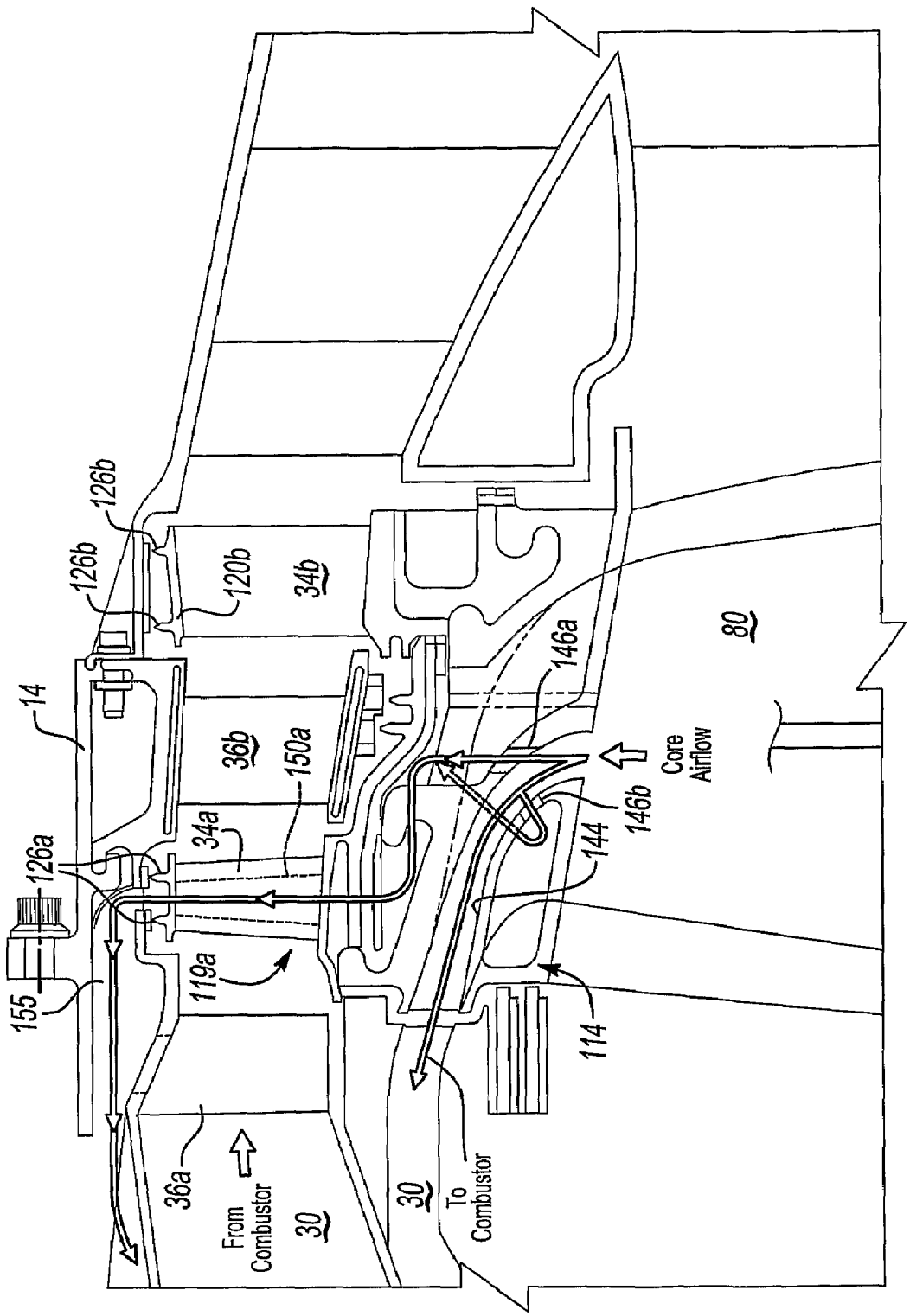
FIG. 13B is a side sectional view of a turbine for a tip turbine engine illustrating another regenerative airflow path through the turbine.

Referring to FIG. 13B, the regenerative cooling airflow is alternatively communicated from the axial static passage 155, directly into the annular combustor 30 with the relatively cooler airflow from the core diffuser passage 144. That is, the regenerative cooling airflow is not first directed through the forward turbine stator 36a.

The received thermal energy is recovered at the highest temperature in the cycle. The engine 10 is thereby benefited twice. Once by the cooling that allows elevated temperatures on the turbine blades 34a and a second time by the regeneration of the thermal energy in the annular combustor 30 which would otherwise lost downstream as per conventional application. It should be understood that various regenerative cooling flow paths may be utilized with the present invention.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of regenerative cooling of a tip turbine engine comprising:
   locating a turbine blade that extends from a fan blade downstream of a discharge flow from an annular combustor;
   locating a turbine stator downstream of a discharge flow from the annular combustor;
   communicating a regenerative cooling airflow through a turbine stator passage in the turbine stator; and
   communicating the regenerative cooling airflow from the turbine stator passage into the annular combustor through a static structure flow passage subsequent to communicating the regenerative cooling airflow the turbine stator passage, the static structure flow passage having an axial component generally parallel to an axis of rotation of the fan blade.

2. A tip turbine engine comprising:
   a compressor for compressing a core airflow;
   a fan for accelerating bypass airflow and having a core airflow passage that receives said core airflow from said compressor;
   an annular combustor for introducing fuel and combusting said core airflow from said fan; and
   a turbine for extracting energy from said core airflow exiting said annular combustor, said turbine having at least one stage defined by a turbine blade that extends from a fan blade and a turbine vane, wherein said vane has a vane passage to receive a regenerative cooling airflow portion of said core airflow from said fan, said regenerative cooling portion of said core airflow exiting said vane passage for communication to said annular combustor, said regenerative cooling airflow portion of said core airflow is communicated through a turbine blade passage of said turbine blade prior to communication through said turbine vane passage.

3. The tip turbine engine as recited in claim 2, wherein a static structure flow passage communicates the regenerative cooling airflow within said static structure flow passage in a direction generally opposite a bypass airflow generated by said fan blade section.

4. A method as recited in claim 1, wherein communicating the regenerative cooling airflow from the turbine stator passage into the annular combustor in a direction generally opposite a propulsive airflow generated by the fan blade.

\* \* \* \* \*